(12) United States Patent
Campanale et al.

(10) Patent No.: US 7,536,509 B2
(45) Date of Patent: May 19, 2009

(54) METHOD FOR FETCHING DATA FROM A NON-VOLATILE MEMORY IN AN INTEGRATED CIRCUIT AND CORRESPONDING INTEGRATED CIRCUIT

(75) Inventors: Fabrizio Campanale, Zürich (CH); Gijs Van Steenwijk, Birmensdorf (CH)

(73) Assignee: DSP Group Switzerland AG, Zurich (CH)

( * ) Notice: Subject to any disclaimer, the term of this patent is extended or adjusted under 35 U.S.C. 154(b) by 220 days.

(21) Appl. No.: 10/512,621

(22) PCT Filed: Apr. 29, 2003

(86) PCT No.: PCT/IB03/01636

§ 371 (c)(1),
(2), (4) Date: Oct. 26, 2004

(87) PCT Pub. No.: WO03/094036

PCT Pub. Date: Nov. 13, 2003

(65) Prior Publication Data

US 2005/0166004 A1    Jul. 28, 2005

(30) Foreign Application Priority Data

Apr. 30, 2002   (EP)   ................................. 02009727

(51) Int. Cl.
   *G06F 12/00*   (2006.01)
   *G06F 13/00*   (2006.01)
   *G06F 13/28*   (2006.01)
(52) U.S. Cl. ........................ 711/118; 711/140; 711/154
(58) Field of Classification Search .................. 711/154, 711/118, 140
   See application file for complete search history.

(56) References Cited

U.S. PATENT DOCUMENTS 5,586,081 A * 12/1996 Mills et al. ............. 365/230.08

(Continued)

FOREIGN PATENT DOCUMENTS

GB   2 338 321 A   12/1999

OTHER PUBLICATIONS

Jim Handy, "The cache Memory Book: The Authoritative Reference on cache Design," Academic Press, 1998; address comparator [pp. 14-15], the tag [pp. 14 and 24-25], cache "hit" and "miss" [p. 13].*

*Primary Examiner*—Sheng-Jen Tsai
(74) *Attorney, Agent, or Firm*—Ohlandt, Greeley, Ruggiero & Perle, L.L.P (57) ABSTRACT

The method uses an integrated circuit comprising a processor (603), a non-volatile memory (602), especially a flash memory, a system clock and an interface (605), which is connected on the one side to the processor (602) and on the other side to the non-volatile memory (602). When the address (ba[ ]) provided by the processor (603) has changed, the interface (605) leads the address (ba[ ]) to the non-volatile memory (602), creates a strobe signal (CL; DCR) within the system clock cycle during which the address (ba[ ]) has changed and directs it to the non-volatile memory (602). As soon as the data in the non-volatile memory (602) corresponding to the address (ba[ ]) are available the data will be directed to the processor (603). Thereby it is possible to get on the integrated circuit the highest data throughput according to the flash memory (602) access time and a minimized chip area at the same time.

10 Claims, 11 Drawing Sheets

U.S. PATENT DOCUMENTS

| | | |
|---|---|---|
| 5,802,554 A | 9/1998 | Caceres |
| 6,026,465 A * | 2/2000 | Mills et al. .................. 711/103 |
| 6,385,688 B1 * | 5/2002 | Mills et al. .................. 711/103 |
| 6,564,285 B1 * | 5/2003 | Mills et al. .................. 711/103 |
| 2004/0153482 A1 * | 8/2004 | Rowlands .................. 707/204 |

* cited by examiner

METHOD FOR FETCHING DATA FROM A NON-VOLATILE MEMORY IN AN INTEGRATED CIRCUIT AND CORRESPONDING INTEGRATED CIRCUIT

The invention relates to a method for fetching data from a non-volatile memory embedded in an integrated circuit and to an integrated circuit particularly adapted to execute this method.

Integrated circuits of this kind are extensively used in portable devices, e.g. wireless modules, Bluetooth devices, mobile phones, digital cordless devices or personal digital assistants (PDAs). In this market, size and power consumption are decisive factors, thus the small area factor becomes a primary request. Consequently, the chance to integrate a non volatile memory on the die of a memory control unit (MCU) of the baseband system seems to be the best choice in terms of reduced components count, low pinout count, routability and reduced system costs.

On the other hand, several other aspects contribute to improve the performance/costs ratio of a baseband system on chip (SOC).

Though depending somewhat on the architectural features, one of the most effective characteristics is an appropriately chosen memory hierarchy. Distributing the memory resources through a hierarchy with different access capabilities and different costs and sizes results in an overall improvement of the system performance.

Figure 1:
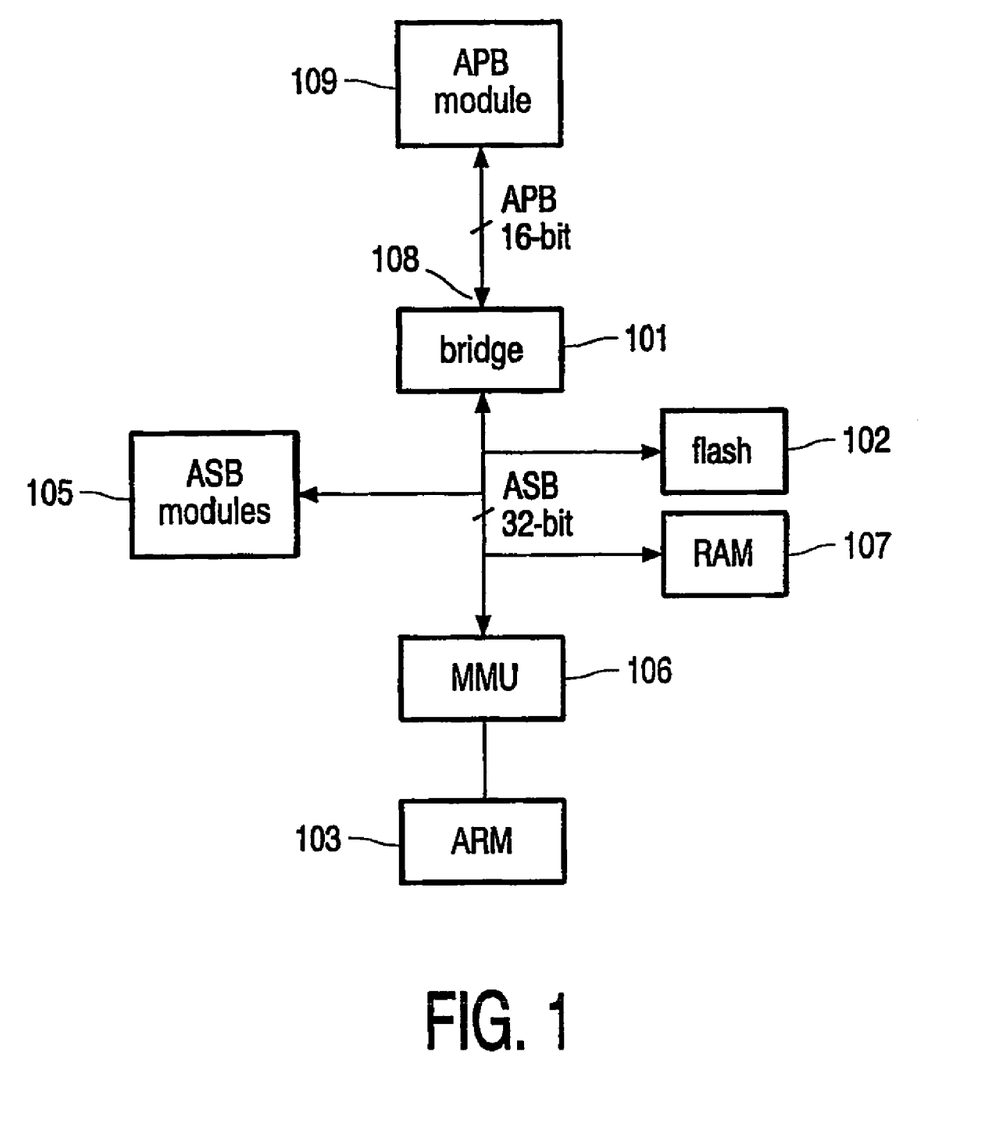
FIG. 1 shows an advanced RISC machine based subsystem with embedded flash memory according to the state of the art.

A typical, so-called Harvard Architecture is shown in FIG. 1. A bridge 101 is connected over a 32-bit bus 104 to advanced system bus (ASB) modules 105, a memory management unit (MMU) 106, a RAM 107 and a flash memory 102. An advanced RISC machine (ARM) 103 is connected to the MMU 106. Over a 16-bit bus 108, the bridge 101 is connected to advanced peripheral bus (APB) modules 109. These can be universal serial bus (USB) modules, for example. It is evident that the main costs in terms of area are in the memory hierarchy. So a smart choice of the sizes and types of memory, strictly depending on the performance required, is the base of design success.

Applications requiring a certain layer of software for the microcontroller within a Harvard Architecture, a read only memory (ROM) is typically used for the instruction memory (IMEM), while for the data memory a volatile memory, e.g. a DRAM or SRAM, is the best choice. The advantage of this lies in the chance to use the bootcode memory space on the die also as instruction memory, thus saving space and increasing the robustness and the security of the system. The advantage is that an embedded ROM, being integrated with the baseline process, does not require special technology options.

Unfortunately such a solution requires a stable software and is thus suitable only for final production cases. On the other hand, most applications need several software refinements, making the ROM solution for the IMEM not suitable. Thus, an embedded flash memory used as IMEM could represent the best solution in terms of size and performance.

In the state of the art Cáceres et al. U.S. Pat. No. 5,802,554, a method and a system for reducing memory access latency by providing fine grain direct access to flash memory concurrent with a block transfer therefrom is described. The memory management unit controls the content of the cache with data either from a first level of memory hierarchy or a second level of memory hierarchy. However this solution cannot use the flash memory as IMEM.

An object of the invention is to provide an integrated circuit and a method for fetching data from a non-volatile memory embedded in an integrated circuit, which are able to get the highest data throughput according to the flash access time and minimized chip area at the same time.

Another object of the invention is to use the non-volatile memory as instruction memory without inhibiting its function as data memory.

The problem is solved by a method for fetching data from a non-volatile memory embedded in an integrated circuit with the features according to any of the method claims and by an integrated circuit with the features according to any of the apparatus claims.

Essentially, the method for fetching data from a non-volatile memory embedded in an integrated circuit according to the invention comprises the following steps:
  When data are requested from the non-volatile memory by a processor, the address corresponding to the data will be forwarded to the non-volatile memory, and
  a strobe signal within the system clock cycle during which the address has changed will be directed to the non-volatile memory.
  As soon as the data in the non-volatile memory corresponding to the address are available, the data will be directed to the processor.

The integrated circuit according to the invention comprises a processor, a non-volatile memory, a system clock and an interface, which is connected on the one side to the processor and on the other side to the non-volatile memory. When the address provided by the processor has changed, the interface leads the address to the non-volatile memory, creates a strobe signal within the system clock cycle during which the address has changed and directs it to the non-volatile memory. As soon as the data in the non-volatile memory corresponding to the address are available the data will be directed to the processor.

Advantageous further developments of the invention arise from the characteristics indicated in the dependent patent claims.

In an embodiment of the invention the non-volatile memory of the integrated circuit is a flash memory.

In synchronous mode, the non-volatile memory will be provided with the address when the strobe signal is active and, in this phase, the read circuitry of the non-volatile memory is active. This saves current and time.

In asynchronous mode, the non-volatile memory will be provided with the address all the time and the read circuitry of the non-volatile memory is always active. Therewith, the access time for data can be reduced.

In another embodiment of the invention, the interface is provided with an address comparator which compares the address on the bus with a tag.

In a further embodiment of the invention, the address comparator is a permanent address comparator, which compares the address on the bus with the tag permanently and delivers an output signal as soon as the address is stable, whereby the output signal shows whether the address is a new one. This reduces the time for decision whether the address is a new one.

To reduce the time for waiting for the data, a cache is provided which buffers a part of the data stored in the non-volatile memory. When the interface detects that the data corresponding to the selected address are already in the cache, the data are directed immediately from the cache to the processor. When the interface detects that the data corresponding to the address are not in the cache, the interface creates a wait signal for the time period of the memory access time and afterwards directs the data from the non-volatile memory to the processor.

Subsequently, the invention is further explained with the eleven following figures.

Integrating the flash memory on the same die on which the microprocessor is integrated raises several problems, both from a technology point of view, for example because of power consumption, leakage or qualification, and from an architectural point of view, the for example because of testability or interfacing for programming operation of the system. Moreover, if the flash memory is going to be used as direct IMEM for the processor, the difficulties to get good performance explode. In fact the absolute speed of the flash memory in reading access is slower then the speed in the reading access of a ROM or RAM. This implies that using the flash memory in the critical data path of the application will represent the bottleneck of the whole system.

Figure 2:
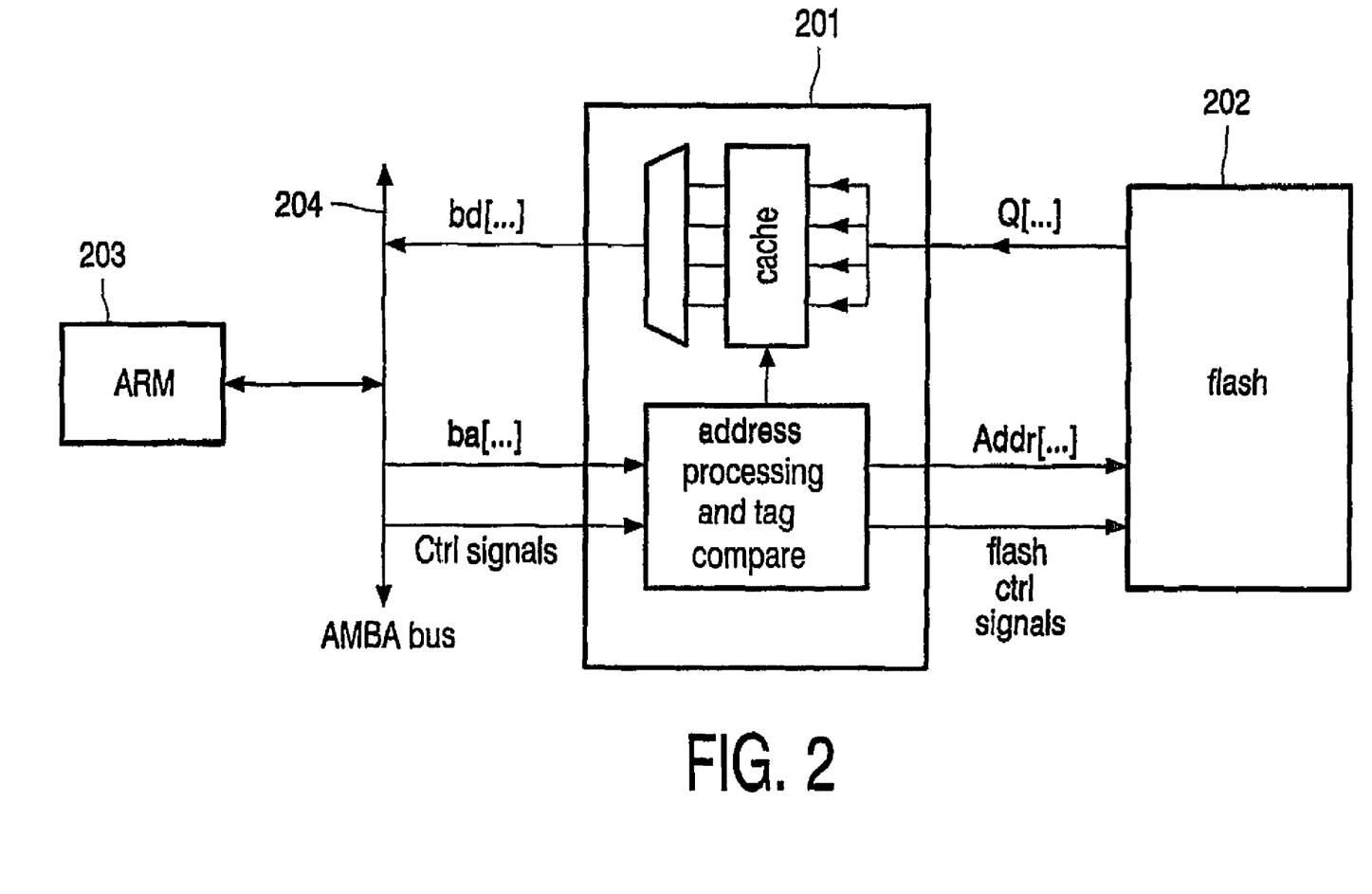
FIG. 2 shows a line cache between the system bus and the flash memory with flash memory word width larger then the bus width according to the state of the art.

The embedded flash memory access time must keep pace with the microprocessor clocking rates to achieve the required processor performance. A solution in order to solve this problem is a further volatile memory layer in the memory hierarchy between the flash memory 202 and the processor 203 as shown in FIG. 2. A so-called line cache 201 with a controller interfaces the flash memory 202 to the high speed microcontroller bus system 204. Although this subsystem is well suited for managing a complex system with multiprocessors, several volatile caches other than the flash memory and several clock domains, it is inefficient in a typical single processor system with only the flash memory as IMEM with high emphasis on the read performance of the memory.

In FIG. 2 is a typical advanced RISC machine (ARM) based bus subsystem (AMBA bus) shown. In the typical application, the flash memory 202 is too slow to be used as IMEM if the system clock period is shorter then the achievable flash memory cycle time. The possible solution in this case is to integrate an interface 201 with the flash memory 202 which serves for increasing the data word width of the flash memory and for providing an address tag register which allows using the intermediate data storage registers as a cache with one or more lines. Such a system, due to the necessity of arbitration among several masters or ARM 203 and clock domains, creates a further bottleneck other then the flash memory 202 for the data throughput.

Figure 3:
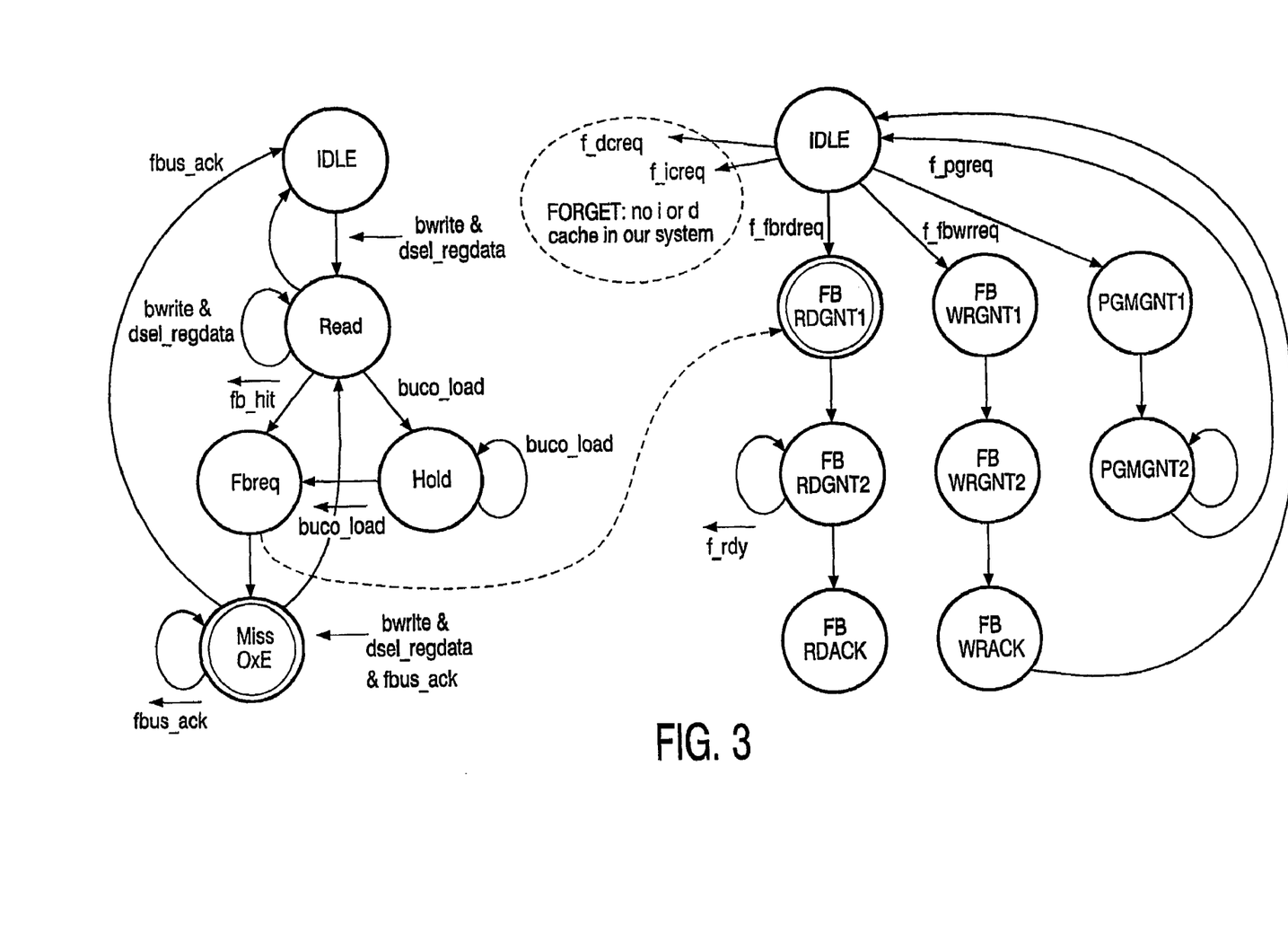
FIG. 3 shows a state machine which controls the read operation in the architecture of the flash memory bridge according to the state of the art.

The flash bridge is mainly composed by three state machines as shown in FIG. 3: a cache controller state machine (CACO-SM), a bus controller state machine (BUCO-SM), and an arbiter state machine for managing the reading and the writing operation and the acknowledgement of the internal bus. This means the control, address and data bus between the controller and the flash memory.

The reading operation is controlled by the CACO-SM and the arbiter state machine. In the following a normal reading access with a miss in the cache memory, starting from the idle state is described. As shown in FIG. 3, the sequence of events is:

1. Read request:
    1.1. ½ clock after the AMBA bus address ba[ . . . ] change, the CACO-SM goes in Read state,
    1.2. the bus address ba[ . . . ] is registered in the register bus address rba[ . . . ],
    1.3. tag cache compare and the flash hit signal f_hit<=0.
2. Miss recognition:
    2.1. as soon as the flash hit signal f_hit=0, the CACO-SM goes in flash bus request state Fbreq,
    2.2. the internal bus request signal rd_fbus_req which requests the internal bus goes high.
3. Synchronization and arbitration:
    3.1. one clock cycle after a synchronization process, which is needed if different clock domains are present, the flash bus request signal rd_fbus_req is transferred to the arbiter SM flash bus read request signal f_brdreq<=rd_fbus_req,
    3.2. the CACO-SM goes in miss state Miss
4. Granting the flash memory bus:
    4.1. with f_brdreq high, the arbiter goes in FBRDGNT1,
    4.2. the bus address rba[ . . . ] is finally passed to the flash memory address.
5. Flash memory access:
    5.1. One half (½) clock afterwards, the flash strobe signal f_cl goes high and is passed to the real flash strobe signal Flash CL. The real flash read operation starts now.

Figure 4:
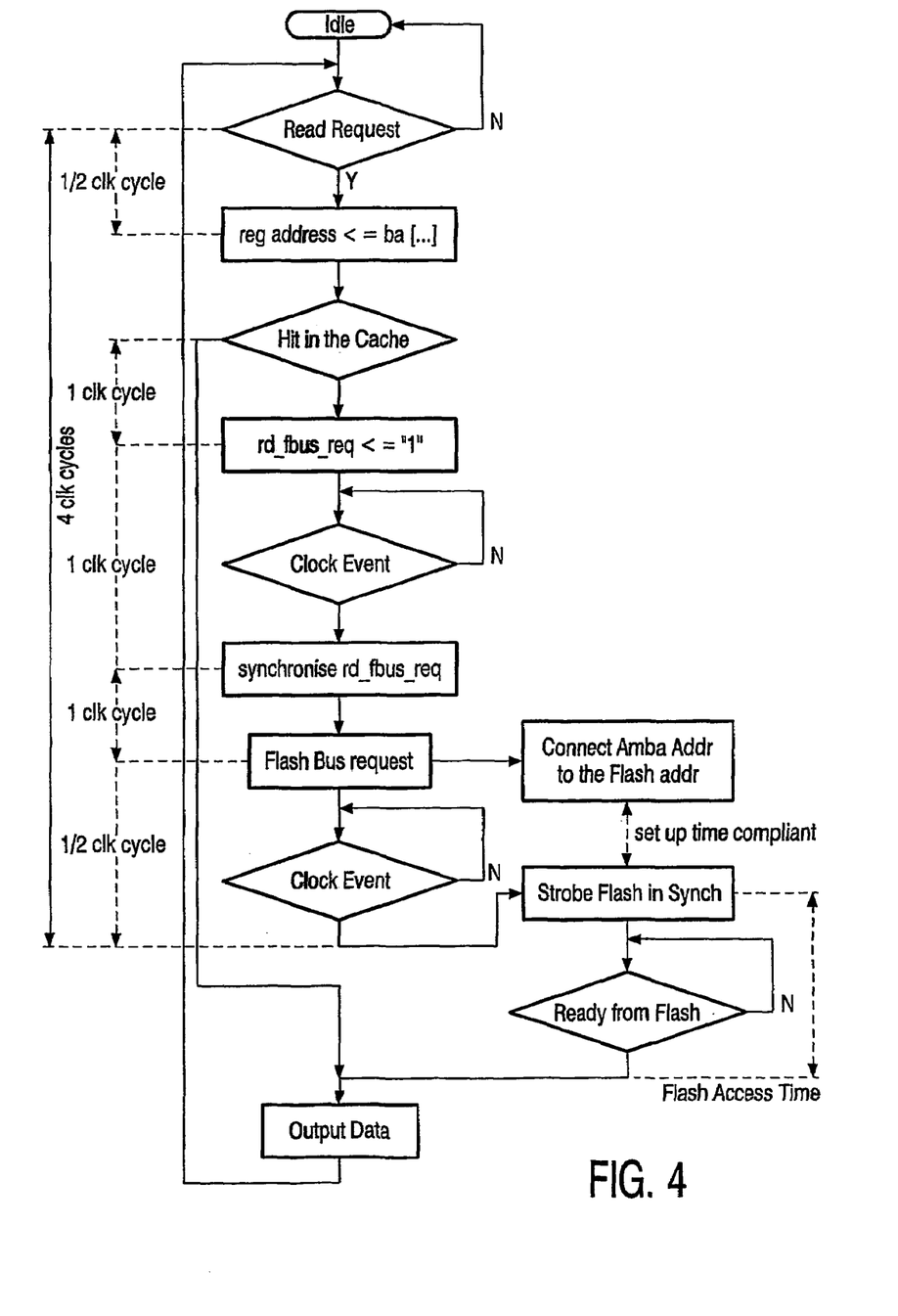
FIG. 4 shows a flow diagram representing the operations performed by the architecture according to the state of the art in reading the flash memory.

The flow chart shown in FIG. 4 represents the sequence of operations required to perform the reading operation and a timing representation of the events.

Figure 5:
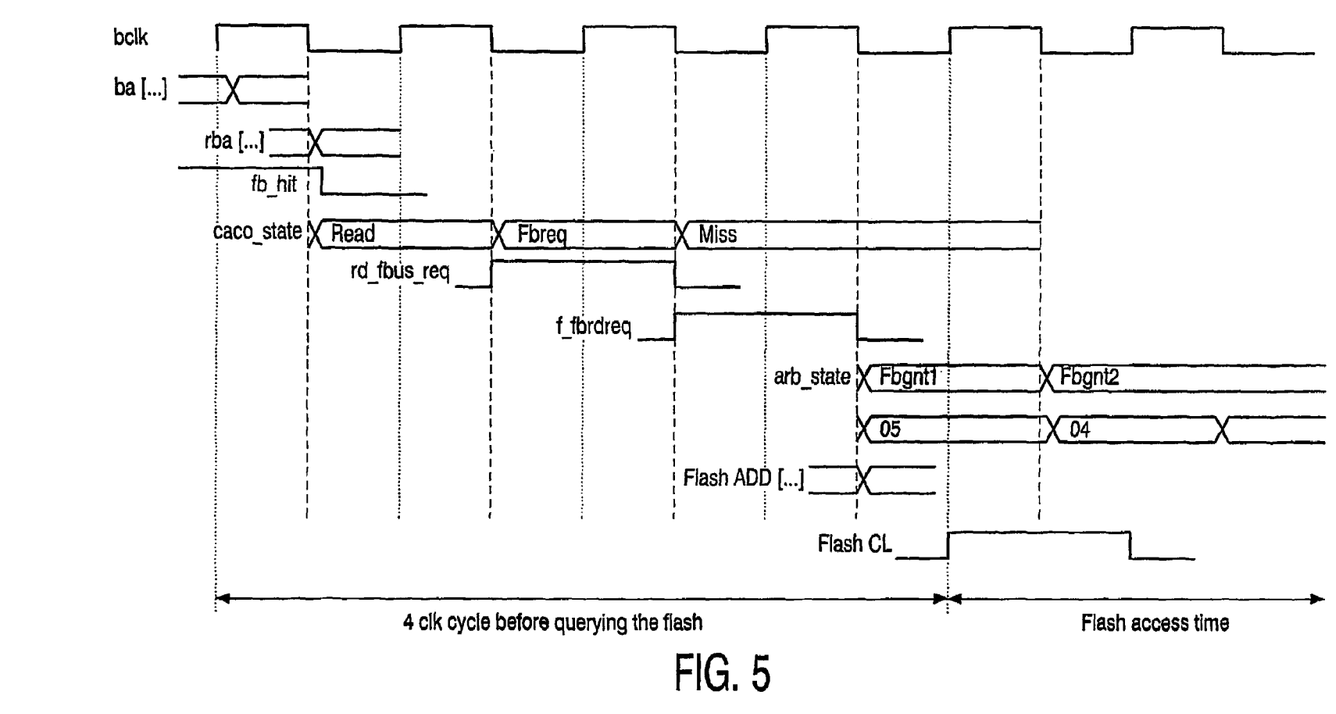
FIG. 5 shows the timing representation of the main signals involved in a read operation with the architecture according to the state of the art.

In FIG. 5, the timing representation of the main signals bus clock bclk, bus address ba[ . . . ], register bus address rba[ . . . ], flash bus hit signal fb_hit, cache control state signal caco_state, flash bus request signal rd_fbus_req, flash bus read request signal f_fbrdreq, arbitration state signal arb_state, flash address Flash ADD[ . . . ] and flash strobe signal Flash CL, as far as involved in a read operation with the above described architecture, is shown.

The analysis shows that with such a controller four clock cycles are spent from the ARM requirement to the real flash read request, independent from the frequency. Therefore this approach for an embedded flash memory bridge, proposed to manage multiprocessor and multiclock domains, is inefficient. This is particularly true for all systems which embed a single microcontroller with a flash memory in a single clock domain, and when the speed requirements become essential both at high and low frequency.

The target of the architecture according to the invention is to waste a minimum of time during a miss in the cache memory. This means, in the ideal case, that the latency for this type of access should be the minimum number of clock cycles which are necessitated by the real access time of the flash memory. To obtain this result, the flash memory controller should not introduce any unnecessary clock cycle before strobing the flash memory. Of course it is impossible to query the flash memory as soon the request comes from the ARM, because it is a hit and the query of the flash memory is done in any case. If the next cycle is a miss, the processor has to wait until the reading operation is finished before starting the new one. So, ideally, as soon as the information of a miss of data is available, the flash memory has to be strobed.

Figure 6:
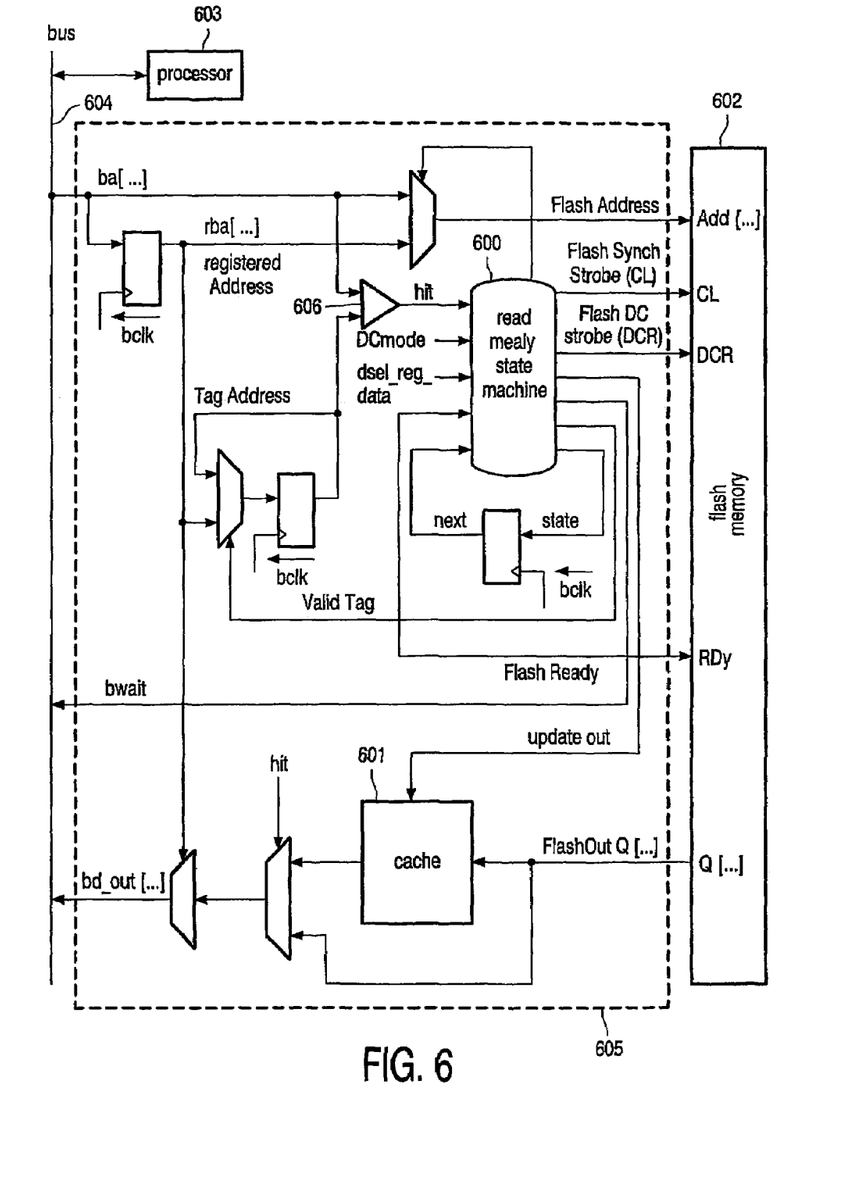
FIG. 6 shows a block diagram of the architecture according to the invention.

An embodiment of the invention in form of a block diagram is shown in FIG. 6. The invention adopts a pseudo-direct memory access (DMA) for the reading operation of the flash memory 602, since the AMBA system is able to access to the flash memory 602 without waiting for the acknowledgment from the controller or interface 605. It consists essentially of a slim and efficient controller for interfacing the internal bus of the flash memory 602 and the AMBA bus 604 in the reading operation, considering this the highest priority operation with the flash memory 602. With such an approach, the flash address bus is already updated simultaneously with the ARM request for fetching data from the flash memory 602. Moreover, the AMBA data bus 604 is directly connected to the flash memory data bus and therefore with the flash data FlashOut Q[ . . . ] since neither synchronization with different clock domains nor bus arbitration is required. At this point, two possibilities are available, depending on the access mode:

1. Synchronous Mode

In the synchronous mode, the flash memory 602 latches the address Add[ . . . ] on the flash sync strobe signal CL. The AMBA addresses ba[ . . . ] stay connected and are immediately available at the device selection. So after only one half (½) clock cycle, which is necessary to wait for the information if the miss is stable, the flash memory 602 will be strobed. This saves 3.5 clock cycles compared to the above mentioned embodiment described in the FIG. 2-5. The flash strobe signal CL is then asynchronously reset by the ready signal of the flash memory Flash Ready. This solution makes it unnecessary to wait a full clock cycle before the flash strobe signal CL cam be driven again. The big improvement is that with this mechanism, at a very low frequency, when the access time of the flash memory is smaller then a clock period, a miss in the cache 601 will not imply any wait states. In fact even if the miss occurs and the flash memory 602 is strobed since the ready signal of the flash memory Flash Ready will come before the next cycle, the microcontroller (in the following also called ARM or processor 603) will not be put into a wait state and could ask for new data already in the next clock cycle. After the strobe signal CL has been reset, it is ready for another cycle.

2. DC or Asynchronous Mode

The DC mode provides the fastest access time, but with a higher power consumption. In the embodiment mentioned above, a mechanism to switch off the flash memory 602 at the end of the reading is present, but wasting the useless first clock cycle increases the power consumption. So the difference to the synchronous mode described hereinafter is that the read operation is triggered by the address change in itself, so after one half ½ clock cycle, the AMBA request, which is necessary for the miss and the DC mode information to be stable, the strobe signal DCR is driven in place of the strobe signal CL and the flash memory address bus is redriven with the registered version of the AMBA address rba[ . . . ]. In this way it can be assured that the address will be stable for all the reading operations. Finally in both cases, as soon the data FlashOut Q[ . . . ] are available from the flash memory 602, they are also available on the AMBA data bus 604. So the release of the wait signal for the processor 603 can be anticipated at least one clock earlier than it can be expected in the above described architecture. This is the time necessary to pass the data from the flash memory 602 to the internal cache register 601.

Figure 7:
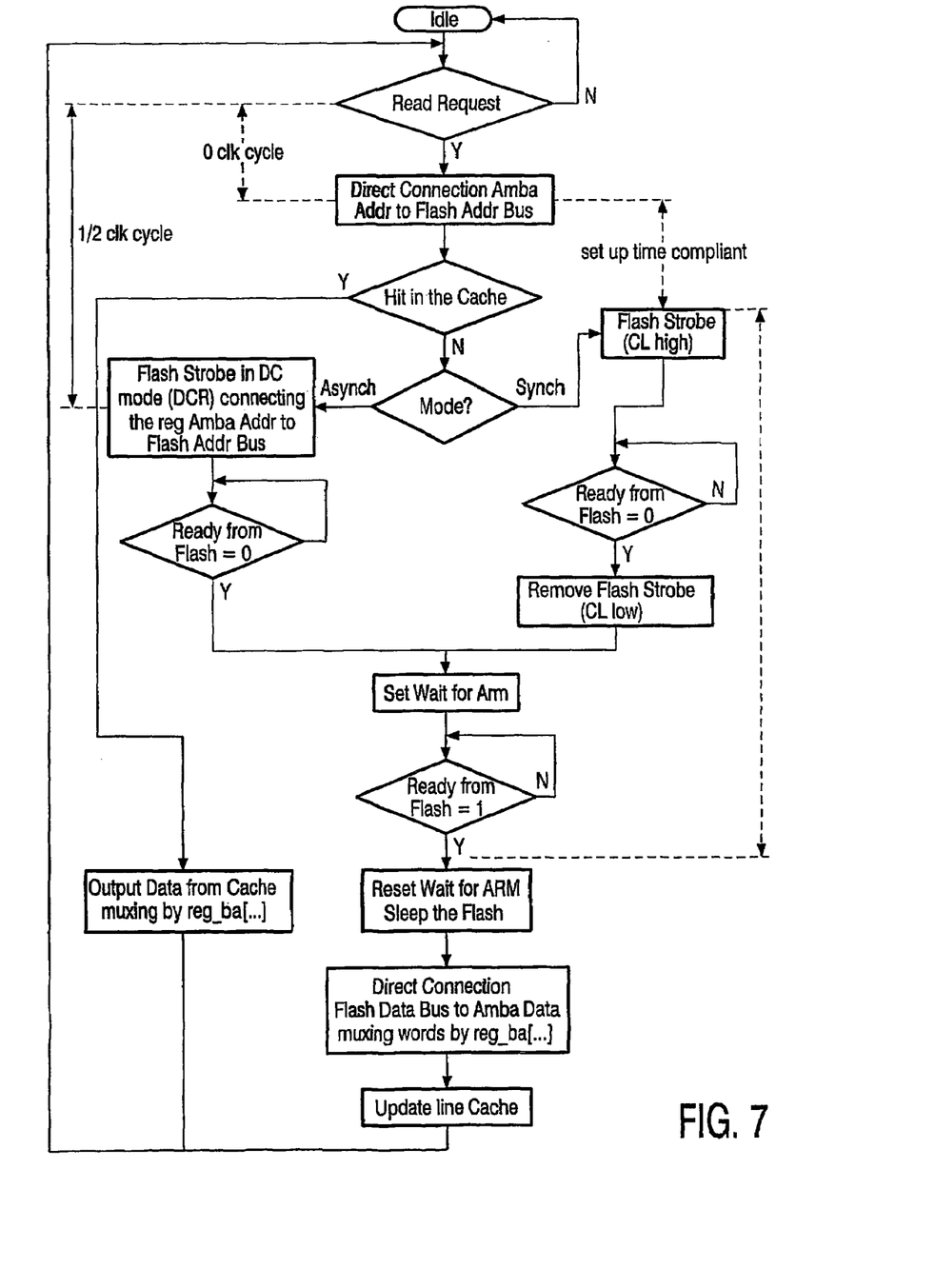
FIG. 7 shows a flow diagram of the operations performed by the architecture according to the invention in self-timed read mode.

The sequence of operations performed by the architecture shown in FIG. 6 is described in the flow diagram shown in FIG. 7. As soon as a read request is detected, a connection between the Amba address bus 604 and the flash address bus is created. Now it has to be checked if the requested data are in the cache memory 601. If this is the case, meaning that a hit is in the cache memory 601, the data in the cache memory 601 are delivered to the Amba data bus 604 by the command Output Data from Cache muxing by reg_ba[ . . . ]. Afterwards the system is ready for a new read request. If the requested data are not in the cache memory 601, the state machine jumps to the branch Mode?. In asynchronous mode Asynch, the flash strobe in DC mode (DCR) connects the registered Amba address rba[ . . . ] to the flash address bus and checks whether a flash ready signal is in the state zero or low. If the flash ready signal is in the state zero or low, a wait signal is set for the ARM and it will be checked if the flash ready signal is in the state one or high. As soon as this is true, the wait signal for the ARM is reset and lets the flash memory sleeping. Now a connection between the flash data bus and the Amba data bus is established by the command Direct Connetion Flash Data Bus to Amba Data muxing words by reg_ba[ . . . ]. Afterwards the line cache memory is updated and the system is ready for a new read request. If the synchronous mode Synch instead of the asynchronous mode Asynch is chosen, the signal flash strobe CL gets high and it is checked whether the flash ready signal is zero. If this is true, the flash strobe signal CL chances into the state low. From now on the state machine executes the same steps as described above.

Figure 8:
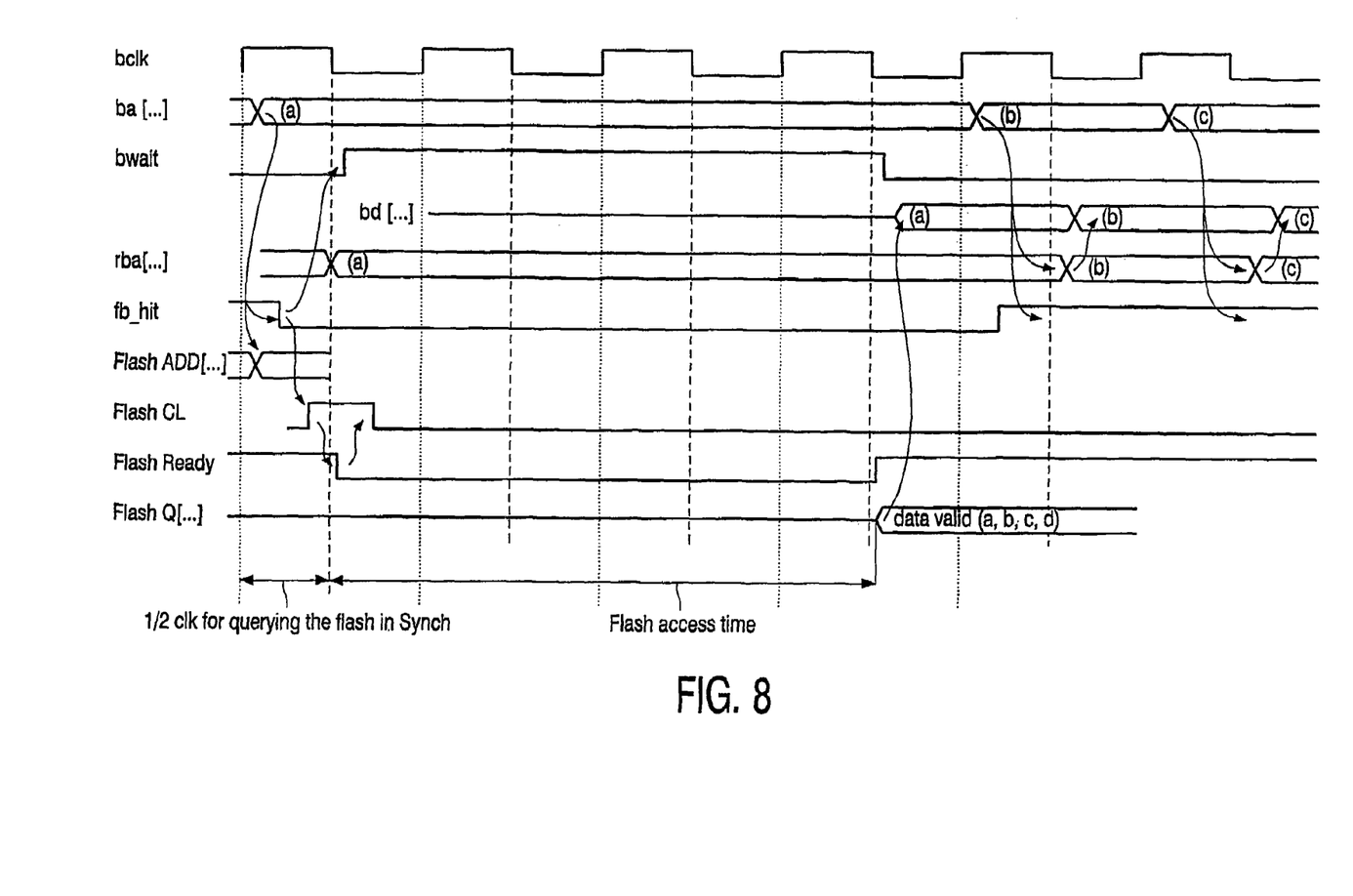
FIG. 8 shows a timing representation of the main signals involved in a synchronous read operation with the architecture according to the invention.
Figure 9:
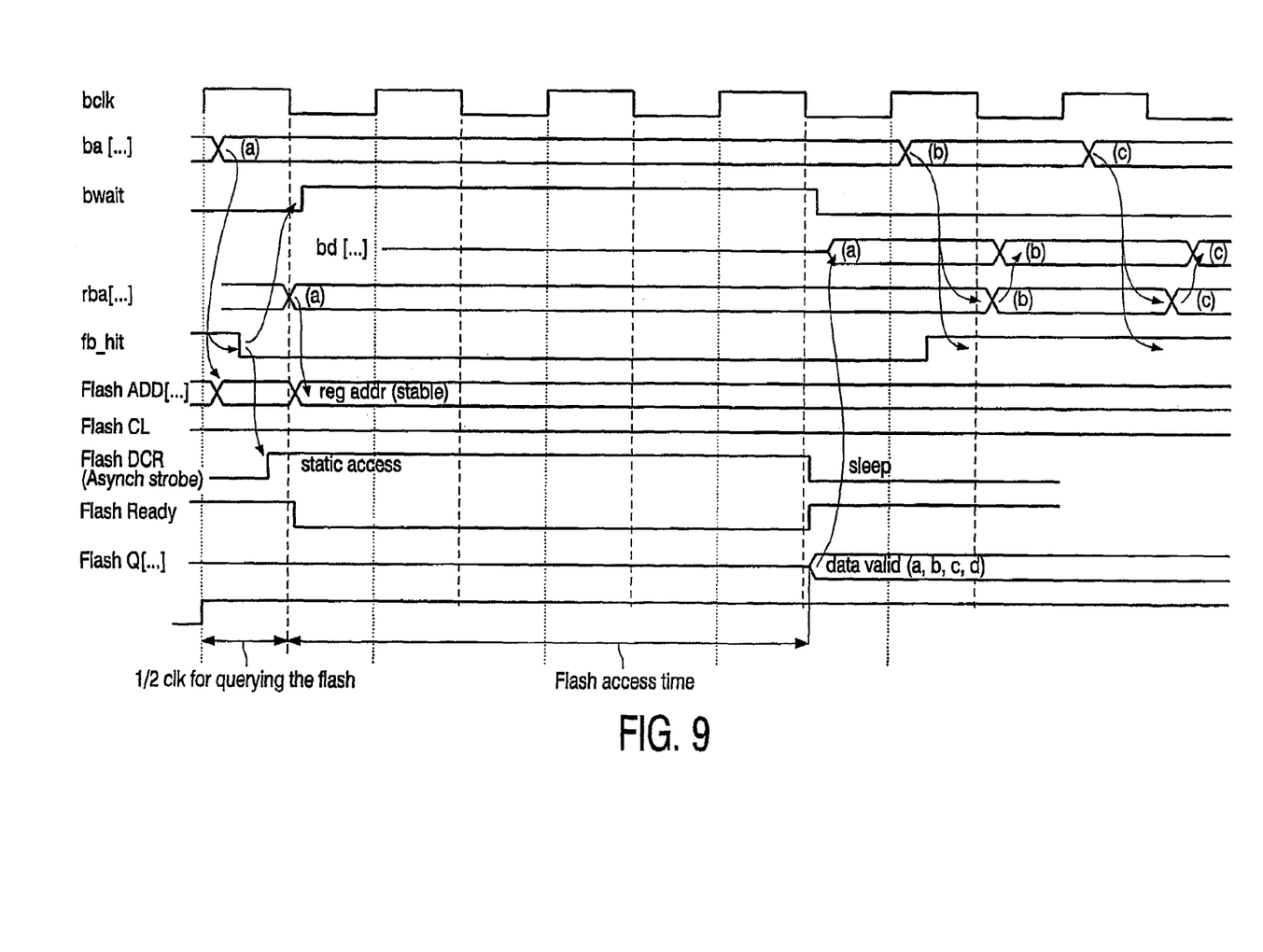
FIG. 9 shows a timing representation of the main signals involved in a asynchronous read operation with the architecture according to the invention.

In FIGS. 8 and 9, the main signals bus clock bclk, bus address ba[ . . . ], bus wait signal bwait, bus data bd[ . . . ], registered bus address rba[ . . . ], flash bus hit signal fb_hit, flash address Flash ADD[ . . . ], flash strobe signal for synchronous mode Flash CL, flash strobe signal for asynchronous mode Flash DCR, Flash Ready and flash data Flash Q[ . . . ] involved in the read miss access in the proposal design are represented.

The speed improvement is shown in FIG. 8. Just half a clock cycle from the AMBA request is needed to decide if it is a miss or a hit before querying the flash memory 602.

The following table summarizes the comparison of the read clock latency at three typical system frequencies and the flash memory with an access time in synchronous mode of 80 ns and in DC mode of 45 ns by typical figures for a 0.18 um embedded flash memory.

|  | DC mode (45 ns) | STL mode (80 ns) |
| --- | --- | --- |
| 48 MHz (21 ns) | 3 clk = 63 ns | 4 clk = 84 ns |
| 24 MHz (41.6 ns) | 2 clk = 83 ns | 2 clk = 84 ns |
| 8 MHz (125 ns) | 1 clk = 125 ns | 1 clk = 125 ns |

Figure 10:
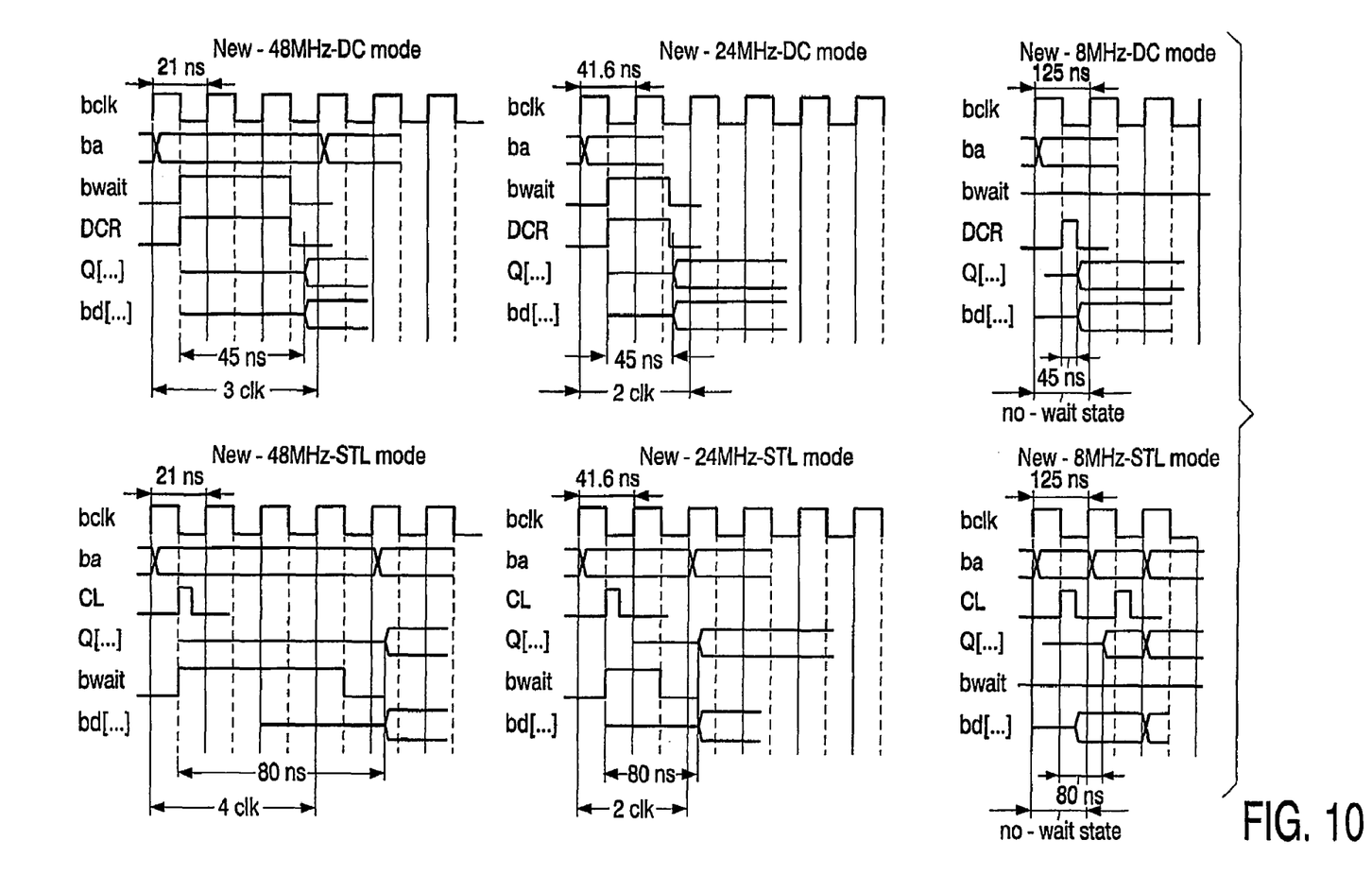
FIG. 10 shows timings of the architecture according to the invention at different clock speed.
Figure 11:
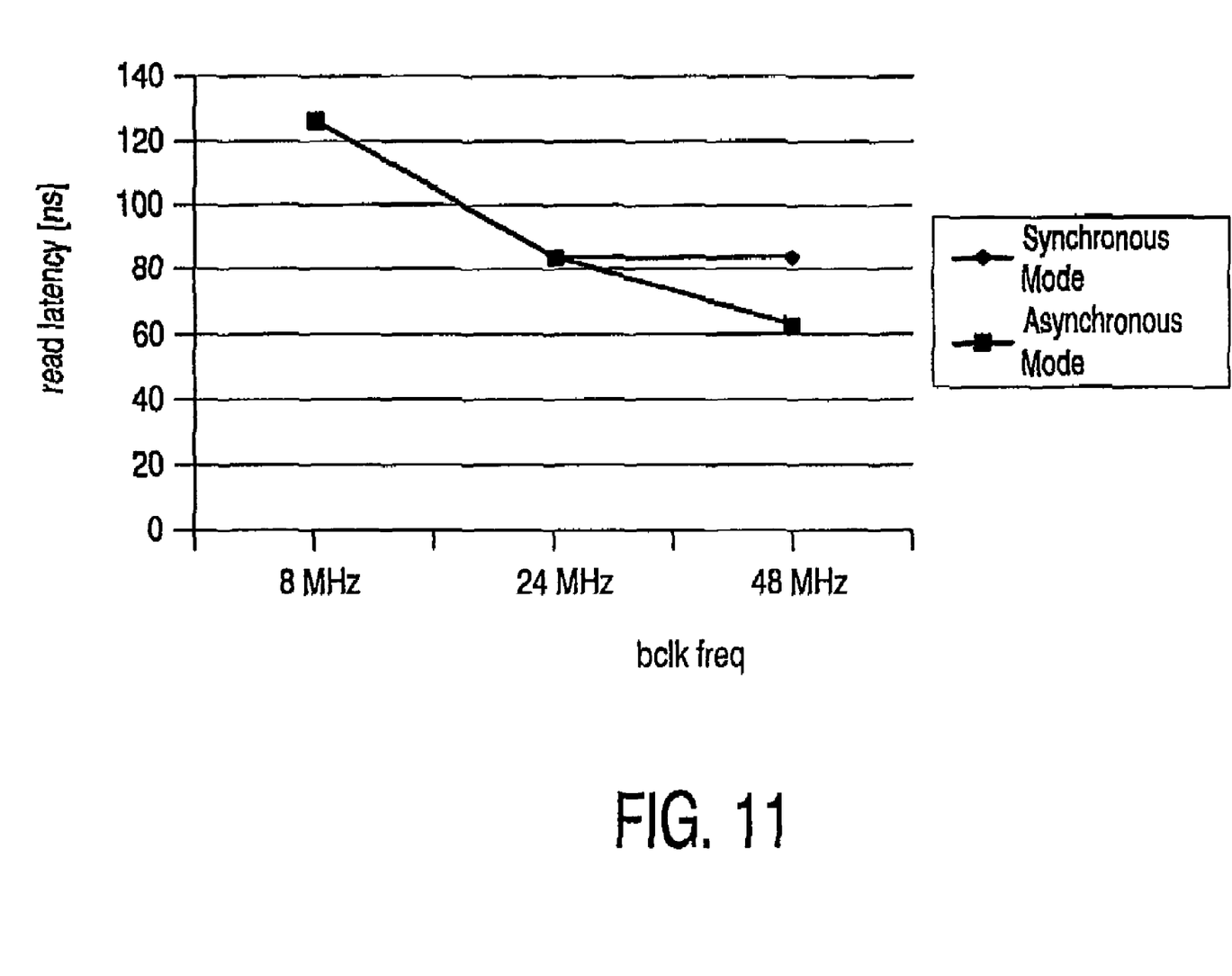
FIG. 11 shows the read latency of the processor according to the invention at three different frequencies.

The charts in FIGS. 10 and 11 show the results.

The invention does not consist in structural interface with the flash memory, but rather in a hardware algorithm meant to provide a fast direct access to memory without introducing unnecessary wait states in case of a miss in the cache. The invention with its architectural implementation is well suited for all the applications in which a single microprocessor as master uses a slow-access, embedded flash memory as instruction memory. For these cases, the computing performances of the system cycles per instruction (CPI) and million instructions per second (MIPS) become strictly dependent to the memory throughput. So the more the interface is fast in querying the flash memory the higher are the performances.

The invention claimed is:

1. A method for fetching data from a non-volatile memory (602) embedded in an integrated circuit with a processor (603) and an interface (605) connecting said processor (603) to said non-volatile memory (602), comprising the following steps:

when new data are requested from said non-volatile memory (602) by said processor (603), the address (ba[ . . . ]) corresponding to said new data will be directed simultaneously to said non-volatile memory (602) and to a cache (601) embedded in said interface (605) that serves as a cache for said non-volatile memory;

determining if the requested address (ba[ . . . ]) is stored in said cache (601) within the same first half of the system clock cycle when simultaneously directing the address occurs;

then if the requested address (ba[ . . . ]) is stored in said cache (601) the data will be provided from said cache (601) to said processor (603);

otherwise a strobe signal within the system clock cycle during which said address (ba [ . . . ]) has changed will be directed to said non-volatile memory (602) to signal said non-volatile memory to provide the data at said address (ba[ . . . ]); and upon availability of said data in said non-volatile memory (602) corresponding to said address (ba[ . . . ]), said data (FlashOutQ[ . . . ]) will be directed to said processor (603).

2. The method for fetching data according to claim 1, wherein, in synchronous mode, the non-volatile memory (602) will be provided with the new data address (ba[ . . . ]) only when the strobe signal is active.

3. The method for fetching data according to claim 1, wherein, in asynchronous mode, the non-volatile memory (602) will be provided with the new data address (ba[ . . . ]) all the time until the new data is transferred.

4. The method for fetching data according to claim 1, wherein when the interface (605) detects that no cached data correspond to said new data address (ba[ . . . ]), creating a wait signal (bwait), preferably for the length of the memory access time.

5. The method for fetching data according to claim 4, wherein when the interface (605) detects that no cached data correspond to the new data address (ba[ . . . ]), the new data (FlashOutQ[ . . . ]) are directed from the non-volatile memory (602) directly to the processor (603) upon availability.

6. An integrated circuit with a processor (603), a non-volatile memory (602), a system clock, an interface (605) connecting said processor (603) to said non-volatile memory (602), and a cache (601) embedded in said interface (605) wherein said interface (605) is equipped, whenever a new address corresponding to requested new data is provided by said processor (603): to deliver the new address (ba[ . . . ]) simultaneously to said non-volatile memory (602) and to said cache (601), determine if the new address is available in said cache (601) within the same first half of the system clock cycle when simultaneously delivering the address occurs; then if the new address is not available in said cache (601) to create a strobe signal within the same system clock cycle during which said address (ba[ . . . ]) has changed and direct it to said non-volatile memory (602) to signal said non-volatile memory to provide the data at said address (ba[ . . . ]), and when the requested new data (FlashOutQ[ . . . ]) is available from said non-volatile memory (602), to direct said new data to said processor (603).

7. The integrated circuit according to claim 6, wherein the non-volatile memory (602) is a flash memory.

8. The integrated circuit according to claim 6, wherein the interface (605) is provided with an address comparator (606), which compares the address (ba[ . . . ]) provided by the processor (603) with a tag.

9. The integrated circuit according to claim 8, wherein the address comparator (606) is a permanent address comparator, which permanently compares the address (ba[ . . . ]) provided by the processor (603) with the tag and delivers an output signal (hit) as soon as the address (ba[ . . . ]) is stable, whereby said output signal (hit) indicates if said address (ba[ . . . ]) is a new one.

10. The integrated circuit according to claim 6, wherein when the interface (605) detects that no data in said cache correspond to the new data address (ba[ . . . ]) provided by said processor (603), creating a wait signal (bwait), preferably for the length of the memory access time, and afterwards directing said data from the non-volatile memory (602) to said processor (603).

* * * * *